No. 807,715. PATENTED DEC. 19, 1905.
C. D. BEVERLY.
COASTER BRAKE.
APPLICATION FILED APR. 27, 1905.
2 SHEETS—SHEET 1.
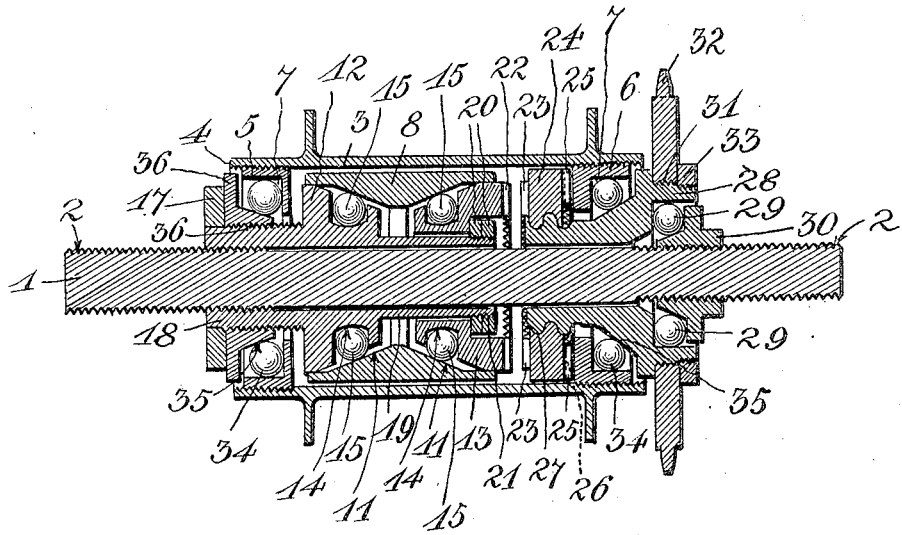
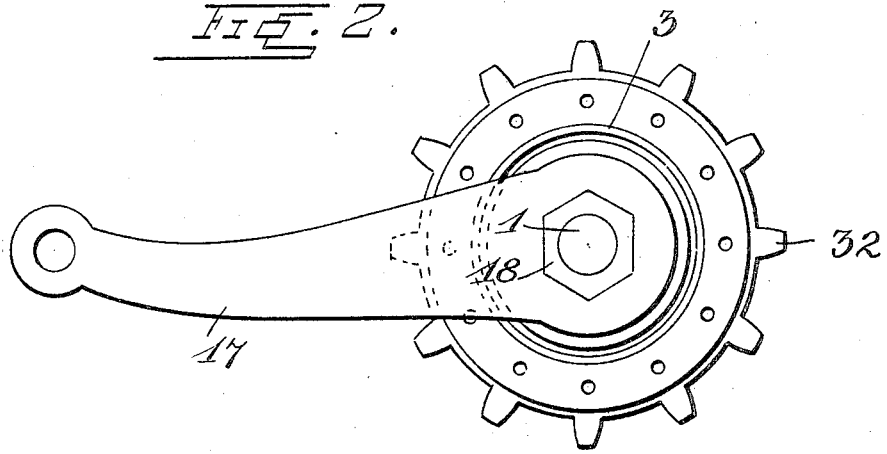
Witnesses
C. Munter
L. O. Hilton
Inventor
C. D. Beverly
by H. B. Willson
Attorney No. 807,715. PATENTED DEC. 19, 1905.
C. D. BEVERLY.
COASTER BRAKE.
APPLICATION FILED APR. 27, 1905.
2 SHEETS—SHEET 2.

Witnesses
C. Muntzer
L. O. Hilton

Inventor
C. D. Beverly
by H. B. Willson
Attorney

UNITED STATES PATENT OFFICE.

CLAUD D. BEVERLY, OF EVANSVILLE, INDIANA.

COASTER-BRAKE.

No. 807,715.   Specification of Letters Patent.   Patented Dec. 19, 1905.

Application filed April 27, 1905. Serial No. 257,652.

*To all whom it may concern:*

Be it known that I, CLAUD D. BEVERLY, a citizen of the United States, residing at Evansville, in the county of Vanderburg and State of Indiana, have invented certain new and useful Improvements in Coaster-Brakes; and I do declare the following to be a full, clear, and exact description of the invention, such as will enable others skilled in the art to which it appertains to make and use the same.

My invention relates to improvements in coaster-brakes for bicycles and the like.

The object of the invention is to provide a device of this character which will be of simple, durable, and comparatively inexpensive construction and very quick and positive in operation.

With the above and other objects in view the invention consists of certain novel features of construction, combination, and arrangement of parts, as will be hereinafter described and claimed.

Figure 3:
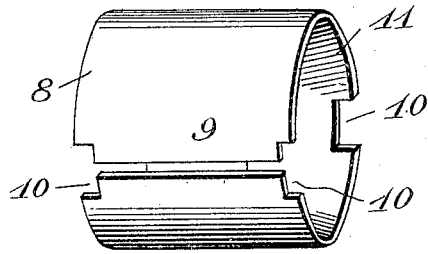
Figure 7:
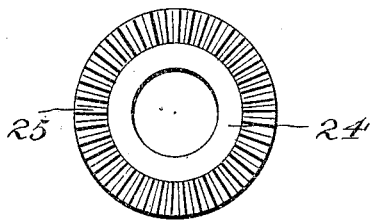
Figure 4:
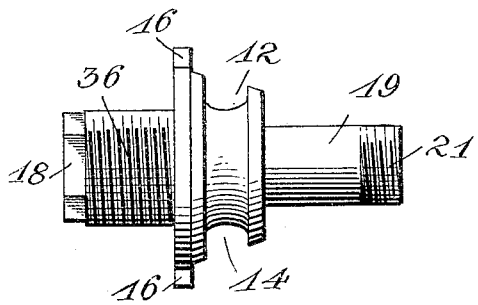
Figure 5:
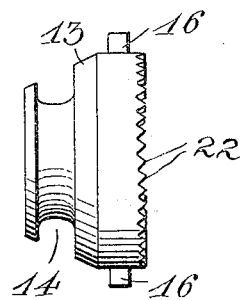
Figure 6:
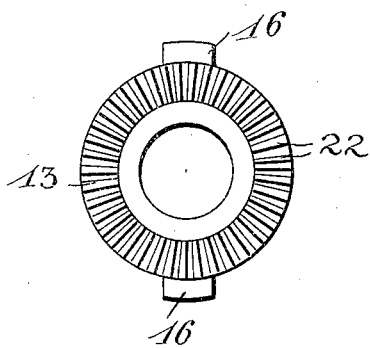
Figure 8:
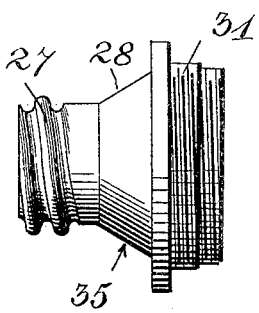

In the accompanying drawings, Figure 1 is a longitudinal sectional view through a coaster-brake constructed in accordance with my invention. Fig. 2 is an end elevation of the same. Fig. 3 is a perspective view of the slitted brake-sleeve. Figs. 4 and 5 are side elevations of the ball-retaining and sleeve-expanding cones. Fig. 6 is an end view of the cone shown in Fig. 5. Fig. 7 is an end view of the driving-clutch, and Fig. 8 is a side elevation of the driver or driving element.

Referring to the drawings by numeral, 1 denotes an axle or spindle having at its ends screw-threads 2, and 3 denotes the barrel or hub of the rear wheel of the bicycle or the like. The barrel 3, which is cylindrical in form, surrounds the axle and has its ends internally screw-threaded, as at 4, to receive caps 5 and 6, which close the ends of the barrel and form bearing-ball-retaining cups 7. Within the central portion of the barrel 3 and surrounding the axle 1 is a brake-sleeve 8, which is of slightly less diameter than the interior diameter of the barrel and which is slitted longitudinally, as shown at 9, so that it can be expanded to cause its outer surface or periphery to frictionally engage the inner surface of the barrel. Said sleeve has at diametrically opposite points in each of its ends notches 10, and its inner face is formed with oppositely-inclined portions 11, as clearly shown in Fig. 1 of the drawings. Disposed within the barrel between the axle and said sleeve are two ball-retaining and sleeve-expanding cones 12 and 13, which are the means whereby the sleeve 8 may be expanded to frictionally lock it to the barrel 3. Each of the said cones is formed with a ball race or cup 14 to receive bearing-balls 15, which engage the inclined portions 11 of said sleeve, and each of said cones is formed at diametrically opposite points with lugs or projections 16, which are adapted to enter the notches 10, formed in the ends of the sleeve 8. The cone 12 is adapted to be fixedly secured upon the axle 1 by screwing it upon the threads 2 at one end of the latter and by means of a lever 17, which is adapted to be secured to the bicycle-frame and to be engaged with a polygonal-shaped reduced portion 18 at the outer end of said cone 12. The inner end 19 of said cone 12 is reduced, as shown, to receive the sliding coacting cone 13. The latter is retained upon said portion 19 of the cone 12, but is permitted to slide inwardly thereon by a pair of lock-nuts 20, which are screwed, as shown at 21, upon said portion 19 and which enter a recessed portion in the outer end of said cone 13. The outer face of the sliding cone 13 is formed with an annular series of radially-projecting teeth or projections 22, which interlock with similar teeth or projections 23 formed upon the adjacent face of a driving-clutch head 24. The opposite or outer face of the latter is formed with similar teeth or projections 25, which interlock with teeth or projections 26 upon the inner face of the cap or cup 6 at one end of the barrel. This clutch or clutch-head 24 is screwed upon external screw-threads 27, provided upon one end of a driver or driving element 28, which is in the form of a sleeve mounted to rotate freely upon the axle 1. In order to reduce friction between the driver 28 and the axle 1, the former is provided at its outer end with a ball-race to receive bearing-balls 29, which engage an adjustable cone 30, screwed upon the threads 2 at one end of the axle 1. Upon a threaded portion 31 of the outer end of the driver 28 is screwed a sprocket wheel or pinion 32, which is preferably retained in position by a lock-nut 33, as shown in Fig. 1 of the drawings. In order to permit the barrel or hub 3 to rotate with as little friction as possible, antifriction bearing-balls 34 are provided in the cups or caps 5 and 6 and engage a cone-shaped portion 35 upon the driver 28 and an adjustable cone 36, provided upon a threaded portion 36 at the outer end of the cone 12.

The construction, operation, and advantages of my invention will be readily understood from the foregoing description, taken in connection with the accompanying drawings. It will be seen that when pedaling forward the tension of the chain upon the sprocket 32 causes the latter to revolve, together with the driver 28, so that the latter by reason of its threads 27 will operate the driving-clutch 24 to shift it to the right against the cup or cap 6. The teeth 25 and 26 are thus interlocked to lock the barrel or hub 3 to the driver or driving element 28. When coasting, the rider ceases to pedal, and hence stops the sprocket 32, the momentum of the wheel causing the barrel 3 and cup 6 to continue to rotate, so that the teeth 25 become disengaged from the teeth 26 as the clutch 24 shifts upon the screw-threads 27. When the parts are in this position, there is absolutely nothing to interfere with the free rotation of the wheel. When the rider pedals forward again, the clutch 24 will be shifted into engagement with the cup or cap 6, as previously explained, so that the hub or barrel 3 will be locked to rotate with the driver 28. When it is desired to brake the rotation of the wheel, a backward movement of the pedal, and hence of the sprocket 32 and driver 28, will shift the clutch 24 by reason of the threads 27 to the left to cause its teeth 23 to interlock with the teeth 22 upon the cone 13, the space between the latter and the cap or cup 6 being such that as the teeth 25 become disengaged with the teeth 26 the teeth 23 will engage the teeth 22. In other words, there is just sufficient space between the cone 13 and the cap or cup 6 to permit the clutch to clear them. By this arrangement there can be no lost motion or unnecessary action of the driver. As the clutch 24 shifts to the left it moves the cone 13 and the sleeve 8 to the left, thereby causing the two cones 12 and 13 to be wedged into said sleeve and to expand the latter to cause its outer surfaces to frictionally engage the interior of the barrel 3. The gripping action of the sleeve within the barrel may be varied by varying the pressure or force exerted upon the driver by the backward movement of the pedals; but as soon as the back-pedaling is discontinued the parts will return to their normal position, so that the sleeve 8 will offer no resistance to the rotation of the barrel 3. When said sleeve is in frictional engagement with the barrel, it will be seen that the latter will be locked to the cone 12, which is in turn secured to the axle 1 and the frame of the machine.

Various changes in the form, proportion, and the minor details of construction may be resorted to without departing from the principle or sacrificing any of the advantages of this invention.

Having thus described my invention, what I claim as new, and desire to secure by Letters Patent, is—

1. A coaster-brake comprising an axle, a barrel rotatably mounted thereon, a slitted brake-sleeve between said barrel and said axle, a longitudinally-movable slidably-mounted wedge-shaped element between said sleeve and said axle on the latter, and means for sliding said wedge-shaped element to expand said sleeve and cause the latter to frictionally engage said barrel.

2. A coaster-brake comprising an axle, a barrel rotatably mounted thereon, a slitted brake-sleeve between said barrel and said axle, a slidably-mounted wedge-shaped element to coact with said sleeve and expand the latter to cause it to frictionally engage said barrel, a driving element and a clutch actuated by said driving element to lock either said barrel to said driving element or said barrel to said axle.

3. A coaster-brake comprising an axle, a barrel rotatably mounted thereon, a slitted brake-sleeve between said barrel and said axle, a slidably-mounted wedge-shaped element to coact with said sleeve and expand the latter to cause it to frictionally engage said barrel, a rotary driving element upon said shaft and formed with a screw-threaded portion, and a clutch-head upon the threaded portion of said driving element and adapted to be actuated thereby to cause it to frictionally engage either a portion of said barrel or said wedge-shaped expanding element.

4. A coaster-brake comprising an axle, a barrel rotatably mounted thereon, a slitted brake-sleeve between said barrel and said axle, a slidably-mounted wedge-shaped element to coact with said sleeve and expand the latter to cause it to frictionally engage said barrel, a rotary driving element upon said shaft and formed with a screw-threaded portion, a clutch-head upon the threaded portion of said driving element, and coacting teeth or projections upon the opposite faces of said clutch-head, said wedge-shaped expanding element and one end of said barrel.

5. A coaster-brake comprising an axle, a barrel thereon, a removable cap at one end of said barrel, a slitted brake-sleeve between said barrel and said axle, said sleeve being formed on its inner faces with oppositely-inclined portions and at its ends with notches, a stationary ball-retaining and sleeve-expanding cone secured upon said axle and engaged with one end of said sleeve, a slidable ball-retaining and sleeve-expanding cone engaged with the other end of said sleeve, projections upon said cones engaged with the notches in the ends of said sleeve, bearing-balls between said cones and said sleeve, a driver upon said axle having a screw-threaded inner end, a clutch-head upon the threaded end of said driver, and coacting teeth or projections upon the opposite faces of said clutch-head, said sliding cone and said cap.

6. A coaster-brake comprising an axle, a barrel thereon, ball-retaining caps or cups removably secured in the ends of said barrel, a slitted brake-sleeve within said barrel formed at its ends with notches and upon its inner faces with oppositely-inclined portions, a stationary ball-receiving and sleeve-expanding cone secured upon said axle and engaged with one end of said sleeve, a sliding ball-receiving and sleeve-expanding cone engaged with the opposite end of said sleeve, bearing-balls between said cones and said sleeve, projections upon said cones in engagement with the notches in said sleeve, a driver having a screw-threaded inner end, antifriction bearing-balls between said axle and said driver, a sprocket-wheel upon said driver, bearing-balls between one of said caps and said driver, an adjustable cone upon said stationary ball-receiving and sleeve-expanding cone, bearing-balls between said adjustable cone and the other of said caps or cups, a clutch-head upon the threaded end of said driver and coacting teeth upon the opposite faces of said clutch-head, said sliding cone and one of said caps or cups, substantially as described.

7. A coaster-brake comprising an axle, a barrel thereon, a removable cap at one end of said barrel, a slitted brake-sleeve between said barrel and said axle, said sleeve being formed on its inner faces with oppositely-inclined portions and at its ends with notches, a stationary ball-retaining and sleeve-expanding cone secured upon said axle and engaged with one end of said sleeve and having a tubular portion surrounding said axle, a ball-retaining and sleeve-expanding cone slidably mounted upon said tubular portion and engaged with the other end of said sleeve, projections upon said cone engaged with the notches in the ends of said sleeve, bearing-balls between said cones and said sleeve, a driver upon said axle having a screw-threaded inner end, a clutch-head upon the threaded end of said driver and coacting teeth or projections upon the opposite faces of said clutch-head, said sliding head and said cap.

In testimony whereof I have hereunto set my hand in presence of two subscribing witnesses.

CLAUD D. BEVERLY.

Witnesses:
W. H. COLEMAN,
BEN F. MORRIS.